United States Patent [19]

Bermes

[11] Patent Number: 4,668,789

[45] Date of Patent: May 26, 1987

[54] LIQUID DYE SALTS

[75] Inventor: Rudolf Bermes, Ludwigshafen, Fed. Rep. of Germany

[73] Assignee: BASF Aktiengesellschaft, Ludwigshafen, Fed. Rep. of Germany

[21] Appl. No.: 681,201

[22] Filed: Dec. 13, 1984

[30] Foreign Application Priority Data

Dec. 13, 1983 [DE] Fed. Rep. of Germany ....... 3344978

[51] Int. Cl.$^4$ .................. C09B 25/00; C09B 69/04
[52] U.S. Cl. ....................................... 546/101; 8/658; 106/288 Q
[58] Field of Search .......................................... 546/101

[56] References Cited

U.S. PATENT DOCUMENTS 4,398,916  8/1983  Ambrosiano et al. ............. 546/173
4,560,745 12/1985  Weberndoerfer et al. ...... 546/101 X

FOREIGN PATENT DOCUMENTS 0053220  6/1982  European Pat. Off. ............ 546/101
3020526 12/1981  Fed. Rep. of Germany ...... 546/101

Primary Examiner—Donald G. Daus
Assistant Examiner—Diana G. Rivers
Attorney, Agent, or Firm—Oblon, Fisher, Spivak, McClelland & Maier

[57] ABSTRACT

Novel compounds of the formula I

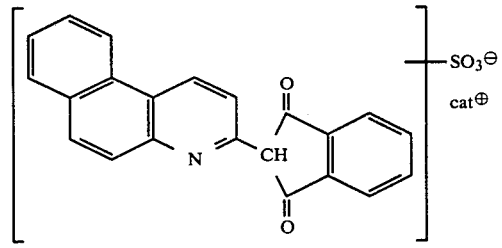

where Cat$\oplus$ is a secondary or tertiary alkylammonium cation of 16 to 30 carbon atoms and the aromatic rings can be further substituted by chlorine, bromine, methyl, methoxy or nitro, are useful for the preparation of low-electrolyte powder and liquid formulations or for coloring organic media.

3 Claims, No Drawings

LIQUID DYE SALTS

The present invention relates to compounds of the formula I

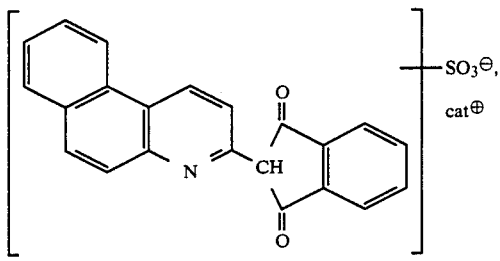

where Cat⊕ is a secondary or tertiary alkylammonium cation of 16 to 30 carbon atoms, and the aromatic rings can be further substituted by chlorine, bromine, methyl, methoxy or nitro. The anion of the formula I which is not further substituted is preferred.

Preferred cations are tertiary alkylammonium ions, in particular those of 17 to 24 carbon atoms and preferably containing branched alkyl radicals.

Specific examples of useful cations are

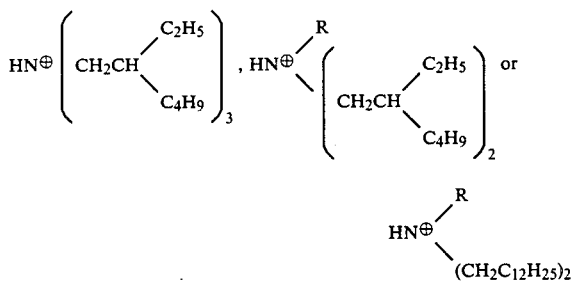

where R is $C_1$–$C_4$-alkyl.

The compounds of the formula I can be prepared by reacting a sulfo-containing compound of the formula I with the amine from which the cation Cat⊕ is derived, to give the salt.

In a preferred method of preparing the salts, the sulfonic acids are extracted from the mixture obtained in the sulfonation, the extraction being carried out with the amines and in accordance with the process described in European Pat. No. 53,220.

The Examples which follow illustrate the preparation. Parts and percentages are by weight, unless stated otherwise.

The compounds of the formula I range from viscous to thinly fluid, depending on the temperature, and are very useful for the preparation of low-electrolyte powder and liquid formulations of the compounds of the formula I in which Cat⊕ is an alkali metal cation, an ammonium cation, or a substituted ammonium cation which imparts water-solubility.

Examples of preferred cations which impart water-solubility are $Li^\oplus$, $Na^\oplus$, $K^\oplus$, $NH_4^\oplus$, $H_3N^\oplus C_2H_4OH$, $H_2N^\oplus(C_2H_4OH)_2$, $HN^\oplus(C_2H_4OH)_3$, $CH_3N^\oplus H_2C_2H_4OH$, $(CH_3)N^\oplus HC_2H_4OH$, $(C_2H_5)_2N^\oplus HC_2H_4OH$, $(CH_3)_2N^\oplus HC_3H_6OH$, $H_3N^\oplus C_4H_8OH$, $CH_3N^\oplus H_3$ or $C_4H_9N^\oplus H_3$.

The stated salts are used as, for example, paper dyes.

The compounds of the formula I are even useful as dyes for organic media, for example in flexographic printing inks, or for purposes where high solubility in an organic medium is required.

Of particular importance are the compounds of the formula I in which Cat⊕ is

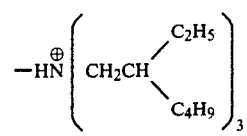

Cations which contain the radical $CH_2C_{12}H_{25}$ are preferably derived from isotridecylamines prepared from tetrameric propylene.

EXAMPLE 1

180.0 parts of naphthoquinophthalone are introduced into 450 parts of 20% strength oleum in the course of three hours, after which stirring is continued for twelve hours at from 25° to 35° C. 14.5 parts of water are then carefully added to the mixture, with the result that the temperature increases to about 60° C., and the mixture is then poured into 2000 parts of hot water. 400 parts of tri-(2-ethylhexyl)-amine are then run in, and the vigorously stirred mixture is heated at from 95° to 100° C. When the stirrer is switched off, an upper liquid phase is formed which mainly consists of naphthoquinophthalonemonosulfonic acid, the amine and sulfuric acid in a ratio of 1:2:1. The lower phase, consisting of dilute sulfuric acid, is separated off and discarded. The liquid dye salt is then thoroughly stirred twice in succession with 2000 parts of water and then once with 1000 parts of water, at from 95° to 100° C. In contrast to the first phase separation, the liquid lipophilic dye salt now forms the lower layer after the stirrer has been switched off. Above this layer, hot wash water collects which, because of partial hydrolysis of the original double salt, washes out the sulfuric acid stepwise from the dye and at the same time liberates some of the tri-(2-ethylhexyl)-amine, which separates out as a third, uppermost liquid phase. The pH's of the wash waters increase from 0.4 through 1.1 to about 1.5, while the sulfate content of the dye phase decreases from an initial value of about 9% to about 0.1%. The three wash waters and the excess amine liberated are separated from the dye phase. 462 parts of a liquid dye salt having a purity of about 91% remain.

EXAMPLE 2

The procedure described in Example 1 is followed, except that 440 parts of N-methylditridecylamine are used instead of the tri-(2-ethylhexyl)-amine. This gives 495 parts of a dye salt having a purity of about 90%.

EXAMPLE 3

The procedure described in Example 1 is followed, except that 331 parts of N-isobutyldi-(2-ethylhexyl)-amine are used instead of the tri-(2-ethylhexyl)-amine. This gives 459 parts of a dye salt having a purity of about 85%.

I claim:

1. An essentially pure liquid compound of the formula

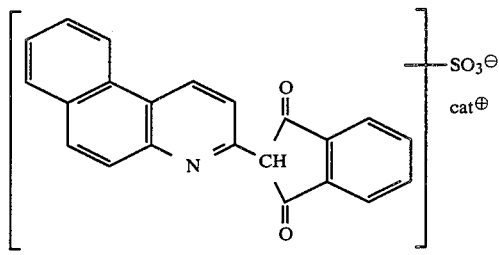
where Cat+ is an alkylammonium cation of the formula
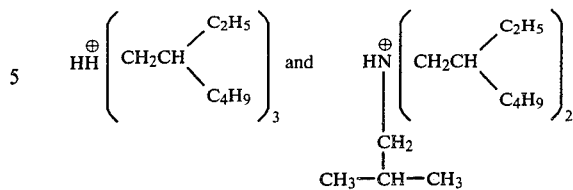
and the aromatic rings of the compound can be further substituted by chlorine, bromine, methyl, methoxy or nitro.
2. A compound as claimed in claim 1, wherein the anion is not further substituted.
3. A compound as claimed in claim 1, wherein the cation is of the formula
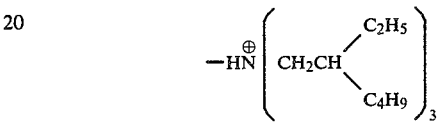
* * * * *

UNITED STATES PATENT AND TRADEMARK OFFICE
CERTIFICATE OF CORRECTION

PATENT NO. : 4,668,789

DATED : May 26, 1987

INVENTOR(S) : Dennis J. Hoover

It is certified that error appears in the above-identified patent and that said Letters Patent is hereby corrected as shown below:

On the title page, insert -- [73] Assignee: Pfizer Inc., New York, N. Y. --.

Signed and Sealed this

Nineteenth Day of July, 1988

Attest:

DONALD J. QUIGG

Attesting Officer

Commissioner of Patents and Trademarks